United States Patent [19]

Hake

[11] Patent Number: 5,409,069
[45] Date of Patent: Apr. 25, 1995

[54] TILLAGE IMPLEMENT WITH GAUGE WHEEL LINKED TO WING LIFTING AND SELF-LEVELING MECHANISM

[75] Inventor: Kenneth A. Hake, Tipton, Kans.

[73] Assignee: Kent Manufacturing, Co., Tipton, Kans.

[21] Appl. No.: 92,218

[22] Filed: Jul. 16, 1993

[51] Int. Cl.6 .......................................... A01B 63/114
[52] U.S. Cl. ................................... 172/400; 172/328; 280/414.5
[58] Field of Search ............... 172/400, 406, 413, 328, 172/327, 326; 280/414.5

[56] References Cited

U.S. PATENT DOCUMENTS

| | | | |
|---|---|---|---|
| 2,723,129 | 11/1955 | Sprague | 280/414.5 |
| 3,202,225 | 8/1965 | Richardson | 172/328 |
| 3,325,184 | 6/1967 | Dunker | 172/328 X |
| 3,912,017 | 10/1975 | Rehn | 172/328 |
| 4,425,971 | 1/1984 | Allen | 172/328 X |
| 4,450,917 | 5/1984 | Hake | 172/328 |
| 4,492,272 | 1/1985 | Jensen | 172/178 |
| 4,606,413 | 8/1986 | Hake | 172/328 |
| 4,712,622 | 12/1987 | Birkenbach et al. | 172/328 |
| 4,762,183 | 8/1988 | Bourgault et al. | 172/400 |
| 5,152,347 | 10/1992 | Miller | 172/7 |
| 5,156,216 | 10/1992 | Van Mill | 172/138 |

FOREIGN PATENT DOCUMENTS

| 204938 | 12/1908 | Germany | 172/400 |
|---|---|---|---|
| 35431 | 9/1913 | Sweden | 172/400 |

*Primary Examiner*—Dennis L. Taylor
*Assistant Examiner*—Christopher J. Novosad
*Attorney, Agent, or Firm*—Litman, McMahon & Brown

[57] ABSTRACT

An agricultural tillage implement includes a center frame portion connected to one or more hinged wing frame portions. Both the center portion and the wing portions include separate hydraulically actuated lifting and self-leveling mechanisms. In each wing portion, one or more rear support wheels are pivotally connected to the implement frame via a rear torque tube which is also connected to the hydraulic lift such that the rear wheel is selectively pivotable relative to the frame to thereby raise and lower the frame with respect to ground level. A front gauge wheel is also pivotally connected to the frame via a front torque tube which is connected to the rear torque tube via a linkage arm and a pair of rocker arms such that the gauge wheel is pivoted in synchronism with the rear wheel to level the wing portion as it is raised and lowered.

14 Claims, 2 Drawing Sheets

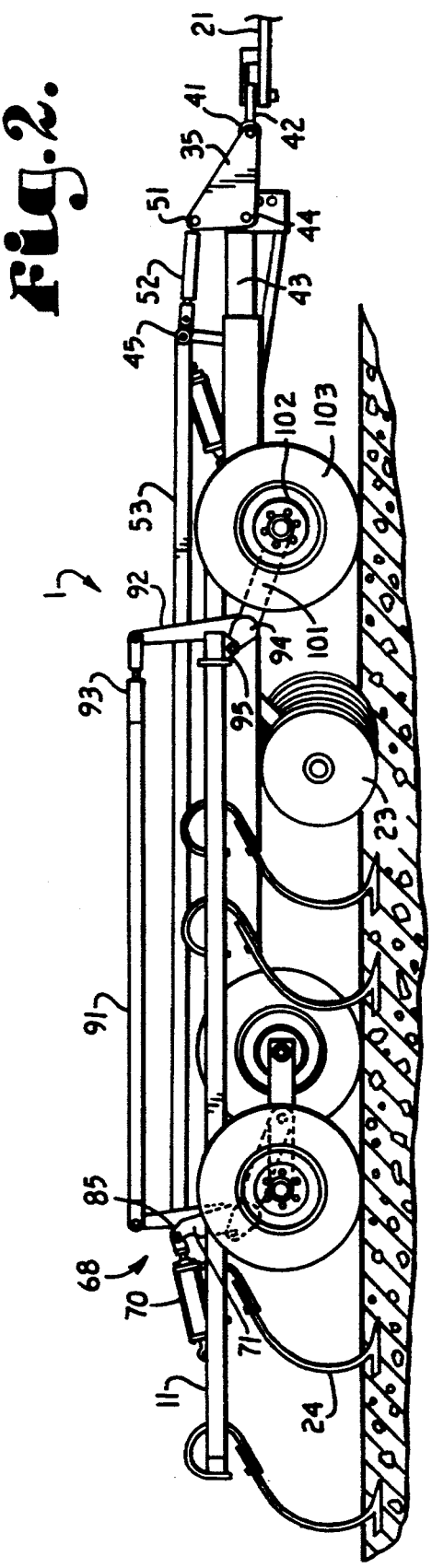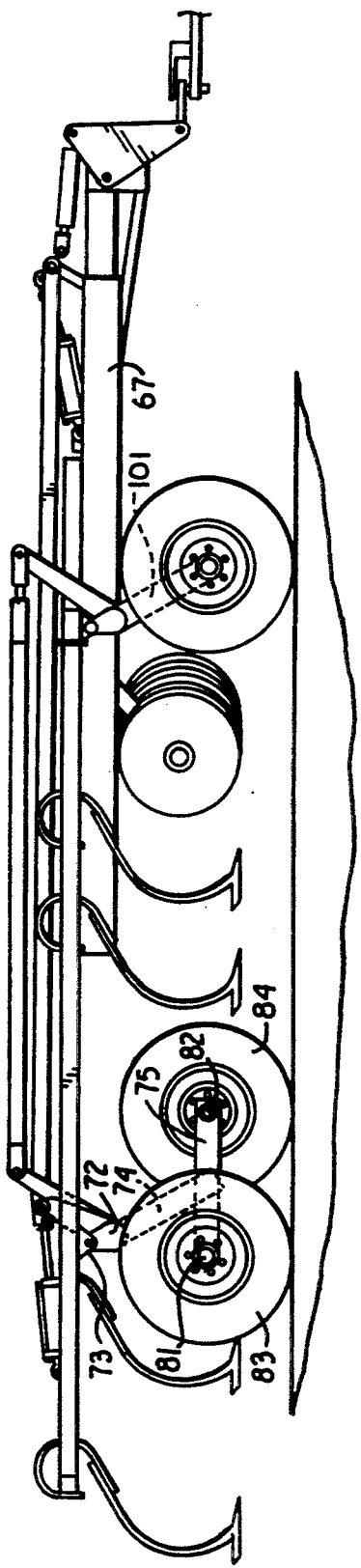

TILLAGE IMPLEMENT WITH GAUGE WHEEL LINKED TO WING LIFTING AND SELF-LEVELING MECHANISM

BACKGROUND OF THE INVENTION

1. Field of the Invention

This invention is directed to an agricultural tillage implement which includes a center portion hingedly attached to a pair of wing portions, and more particularly to such an implement in which the center portion includes a lifting and self-leveling mechanism and the wing portions each include a gauge wheel linked to a separate lifting and self-leveling mechanism so that the entire implement is level from front to back and from side to side.

2. Description of the Related Art

Agricultural tillage implements, such as plows, cultivating discs, etc., have gotten increasingly larger and more sophisticated in recent years. Most such implements are equipped with multiple rows of tillage tools in order to save time and fuel during tillage operations. As these implements have gotten wider, a problem has arisen in transporting the implements down a roadway, for example. In order to address this problem, wider tillage implements have been constructed with a wheel supported center section and one or more hinged wing sections which are adapted to fold over the center section while it is being transported in order to narrow the profile of the implement.

A further problem associated with large tillage implements is that, in order to assure uniform penetration of soil by the tillage tools, the implements must be leveled from front to back.

A number of prior art self-leveling systems have been developed for leveling agricultural implements to provide uniform tillage depth. An example is the applicant's U.S. Pat. No. 4,606,413 which teaches a hydraulic lift with self-leveling mechanism for an implement center portion. The self-leveling system includes a bell crank pivotally attached to a hitch member. As the implement frame is raised or lowered via a hydraulic lift cylinder, the force of the lifting mechanism is transferred about the hitch member. A pair of frame lift linkages are connected from a retractable piston in the cylinder to respective ground engaging wheels via a torque tube and respective lift arms. As the hydraulic cylinder piston is extended, the lift linkages are pushed forward, causing the torque tube to pivot the lift arms and attached wheels downward, thus raising the implement frame with respect to ground level. Conversely, as the piston is retracted, the lift arm is pivoted upward, thus lowering the implement frame. U.S. Pat. No. 4,606,413 is hereby incorporated herein by reference.

With wider implements, it is also important that they be leveled from side to side. This is particularly true of implements with hinged wing sections. In such implements, where the wings include separate ground engaging wheels, both the center section and the wings should be leveled, both from front to back and with respect to each other via the respective wheels. In addition, prior art implements have generally not been adequately supported by wheels at the front corners of the wings. Accordingly, this inadequate support, along with vibration and bouncing of the implement as it traverses the ground have meant that the wing portions flex relative to the center portion. This means that the tillage tools, particularly on the front of the wings, often run at different depths than the other tools, even when the implement is "leveled" via the self-leveling mechanism of the center portion.

It is clear then, that a need still exists for a self-leveling system for a hinged wing tillage implement which provides adequate corner support for the wings as well as leveling the center portion and the wings from front to back and from side to side.

SUMMARY OF THE INVENTION

In the practice of the present invention, an agricultural tillage implement includes a frame with a center portion and a pair of hinged wing portions attached thereto. Each of the wing portions is equipped with tandem rear support wheels attached to either side of a common support arm and a front gauge wheel positioned ahead of the support wheels and in line with the common support arm. A plurality of rows of tillage tools, such as plows or sweeps and discs, are attached to both the center portion and the wing portions. A lifting and self-leveling mechanism is provided for the center portion and each wing portion.

The center portion lifting and self-leveling mechanism is very similar to that disclosed in U.S. Pat. No. 4,606,413 and includes a bell crank attached to a frame hitch on one corner and to a lift arm on a second corner. The lift arm is pivotally connected to a respective pair of frame lift linkages which extend rearwardly to a corresponding pair of rear rocker arms connected to respective main wheels via a common torque tube and a respective of pivoting lift arms. A pair of double acting hydraulic cylinders with retractable pistons are attached to the frame lift linkages. As the hydraulic pistons are extended, the lift linkages are urged forward, causing the bell crank to pivot about the hitch and causing the torque tube to pivot the main wheels downward to raise the implement frame. As the pistons are retracted, a reverse action causes the frame to be lowered.

The inventive wing portion lifting and self-leveling mechanisms are mirror images of each other, with each one including a hydraulic cylinder connected to a lift arm which is connected to a rear torque tube. The rear torque tube is, in turn, connected to a rear pivot arm which is also connected to the common wheel support arm. A gauge wheel lift linkage is connected at one end to the rear torque tube via a first rocker arm and at the other end to a front gauge wheel torque tube via a second rocker arm. A gauge wheel pivot arm is connected between the gauge wheel torque tube and the gauge wheel. With this arrangement, as the wing hydraulic cylinder piston is extended, the rear wheel pivot arm is pivoted downward, raising the implement frame. At the same time, the gauge wheel linkage causes the gauge wheel to be pivoted downward by action of the front torque tube and the gauge wheel pivot arm, thus leveling the wing portion from front to back and providing constant front corner support, via the gauge wheel, to the wing portion. Adjustment screws are provided in the center portion linkage and in each gauge wheel linkage to adjust the implement pitch angle from front to back to accommodate various lengths of tillage tools.

OBJECTS AND ADVANTAGES OF THE INVENTION

The principle objects and advantages of the present invention include: to provide an improved self-leveling mechanism for an agricultural tillage implement; to provide such a mechanism which reliably and conveniently levels the implement; to provide such a mechanism which levels both a center portion and two hinged wing portions of the implement; to provide such a mechanism which includes a leveling linkage between a front gauge wheel and one or more rear support wheels on each wing portion; to provide such a mechanism which in which the front gauge wheel on each wing portion provides enhanced support and stability at the front corner of the corresponding wing; to provide such a mechanism with adjustments for adjusting the angle of the implement from front to back, i.e. the pitch angle of the implement; and to provide such a mechanism which is reliable, economical to manufacture, and which is particularly well suited for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 2 is a side elevational view of the implement with the lifting and self-leveling mechanisms placed in a lowered or tillage position.

FIG. 3 is a side elevational view of the implement with the lifting and self-leveling mechanisms placed in a raised or transport position.

DETAILED DESCRIPTION OF THE INVENTION

I. Introduction and Environment

Figure 1:
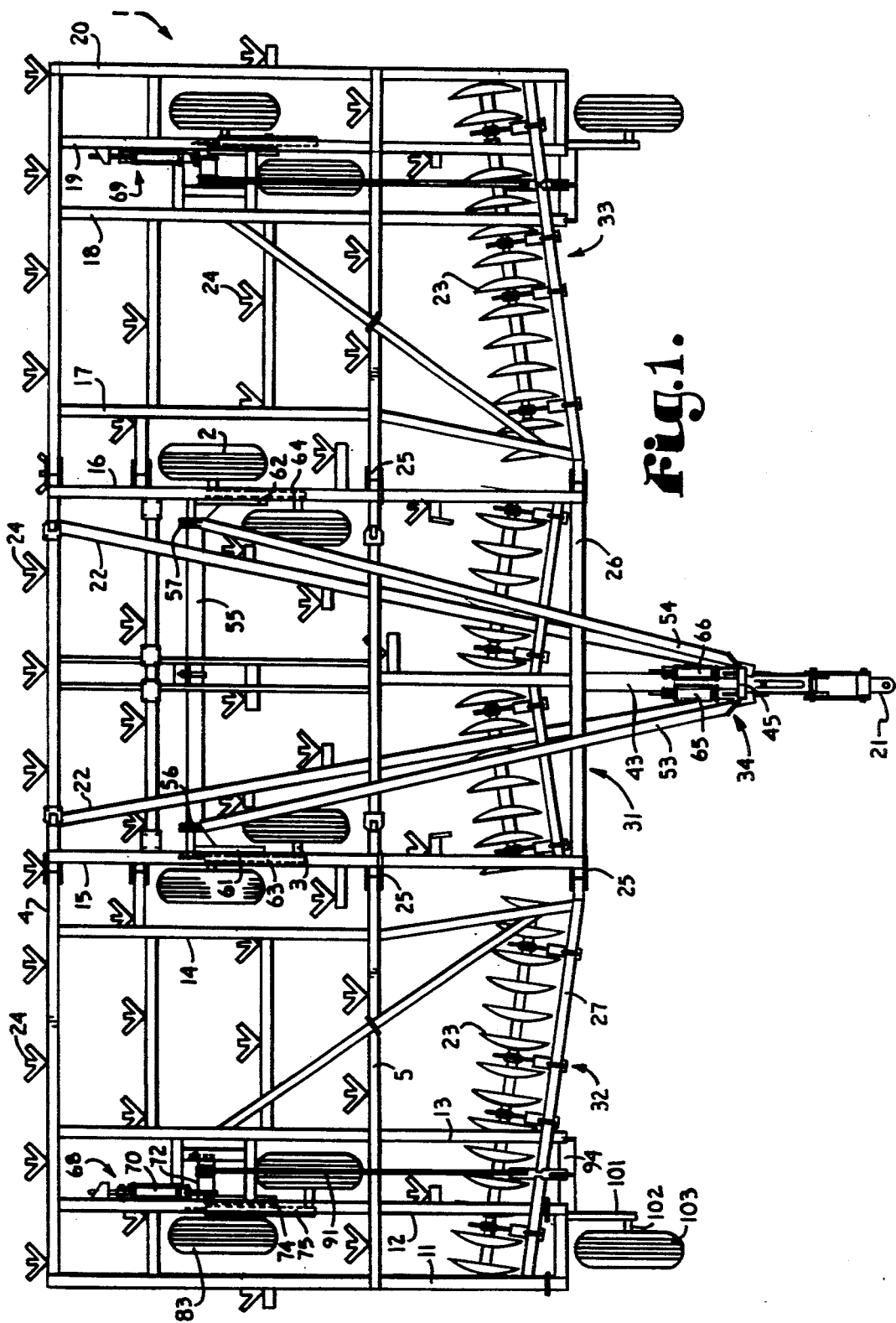
FIG. 1 is a top plan view of an implement frame with a center portion and two hinged wing portions, each of which incorporates a lifting and self-leveling mechanism according to the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Referring to the drawings in more detail, the reference numeral 1 in FIG. 1 generally designates an agricultural tillage implement. The frame 1 includes a plurality of main ground engaging wheels 2 attached to respective axles 3. The wheels 2 and axles 3 support a framework comprising a pair of transversely extending frame members 4 and 5 connected via a plurality of longitudinally extending frame members 11–20. A hitch 21 is connected to the transverse frame member 4 via a V shaped hitch frame member 22. A number of tillage tools, including discs 23 and sweeps 24, are attached to the frame 1.

A number of hinges 25 are positioned in the transverse frame members 4, 5 and between a front frame member 26 and a pair of angled frame members 27, with the hinges 25 dividing the implement 1 into a center portion 31 and a pair of attached wing portions 32 and 33. The hinges 25 allow the wing portions 32 and 33 to be pivoted upward to decrease the width of the frame 1 for transport trailering efficiency. A hydraulic actuating mechanism (not shown) can be provided to mechanically fold the side portions 32 and 33 up and over the center portion 25 for transporting over roadways, through gates, etc.

2. Center Lifting and Self-Leveling Mechanism

Referring to FIGS. 1–3, a center lifting and self-leveling mechanism is generally indicated as 34. The mechanism 34 is essentially the same as that shown in U.S. Pat. No. 4,606,413, mentioned above, and thus will not be described in detail. Briefly, the mechanism 34 includes a lifting bell crank 35 pivotally attached at a front corner 41 to a hitch drawbar 42. The bell crank 35 is pivotally attached to a frame extension member 43 at a second corner 44 and to a cross member 45 at a third corner 51 via an adjustable turnbuckle 52. The cross member 45 is connected between a first end of a pair of center frame self-leveling linkages 53 and 54. An opposite end of each linkage member 53 and 54 is connected to a torque tube 55 via a respective center frame lift arm 56 and 57. The torque tube 55 is connected to a pair of center frame wheel pivot arms 61 and 62, which, in turn, are connected to a respective pair of wheel supporting arms 63 and 64 (shown in phantom lines in FIG. 1). A pair of hydraulic cylinder actuators 65 and 66 are connected between the center frame extension member 43 and the cross member 45.

When the hydraulic actuators 65 and 66 are retracted, the linkages 53 and 54 are pulled rearward, pivoting the bell crank 35 counterclockwise, as illustrated. The lift arms 56 and 57 thus rotate the torque tube 55, which pivots the pivot arms 61 and 62 downward, thus lowering the entire center portion 31 with respect to the ground to the position shown in FIG. 2. Conversely, when the hydraulic actuators 65 and 66 are extended, the linkages 53 and 54 are pulled forward, pivoting the bell crank 35 clockwise, as illustrated in FIG. 3. The lift arms 56 and 57 thus rotate the torque tube 55 in the opposite direction, which pivots the pivot arms 61 and 62 upward, thus raising the entire center portion 31 with respect to the ground to the position shown in FIG. 3.

3. Wing Lifting and Self-Leveling Mechanism

Referring again to FIG. 1, a pair of wing lifting and self-leveling systems 68 and 69 are illustrated. The mechanisms 68 and 69 are mirror images of each other, and thus only the system 68 will be described with particular reference to FIGS. 2 and 3.

The wing lifting and self-leveling system 68 includes a hydraulic cylinder 70 connected to a lift arm 71. The lift arm 71 is connected to a rear torque tube 72. The rear torque tube 72 is pivotally attached to the frame member 12 (FIG. 1) via a pivot point 73. A wing portion pivot arm 74, shown in phantom lines in FIGS. 2 and 3, is also attached at one end to the torque tube 72 and at the other end to a wing wheel support member 75. The member 75 is connected at each end to a respective axle 81 and 82 of a pair of wing frame support wheels 83 and 84.

A first rocker arm 85 is also attached at one end to the torque tube 72 and at the other end to one end of a gauge wheel linkage 91. The other end of the linkage 91 is attached to one end of a second rocker arm 92 via an adjustment screw 93. The other end of the rocker arm 92 is connected to a gauge wheel torque tube 94, which is pivotally connected between the frame members 12 and 13 via a pivot support 95. A gauge wheel lift arm 101 is connected at one end to the torque tube 94, and at the opposite end to a gauge wheel axle 102, which is supported by a gauge wheel 103.

4. Operation

The operation of the wing portion lifting and self-leveling system 68 will now be described, again with reference to FIGS. 2 and 3. When the wing hydraulic cylinder 70 is retracted, as shown in FIG. 2, the lift arm 71 is pulled rearward, thus causing the torque tube 72 to rotate in a counterclockwise direction, as illustrated. The torque tube 72 thus causes the lift arm 74 to pivot downward, thus causing the wing portion 32 to be lowered toward the ground, and thus causing the tillage tools 23 and 24 to engage the soil. At the same time, the torque tube 72 causes the first rocker arm 85 to pivot backward, thus pulling the linkage 91 to the rear and causing the second rocker arm 92 to also pivot backward. This action causes the gauge wheel torque tube 94 to pivot counterclockwise, as illustrated, thus causing the lift arm 101 to pivot upward, leveling the front end of the wing portion 32 with the rear end thereof as the tillage tools 23 and 24 engage the soil. This causes all of the tillage tools 23 and 24 to run at the same depth, yielding uniform tillage results. The gauge wheel 103 provides added support at the front of the wing portion 32, thus minimizing the effect on tillage depth as the implement 1 flexes and vibrates.

As the cylinder 70 is retracted, as shown in FIG. 3, the lift arm 71 is pushed forward, thus causing the torque tube 72 to rotate in a clockwise direction, as illustrated. The torque tube 72 thus causes the lift arm 74 to pivot upward, thus causing the wing portion 32 to be raised with respect to the ground, and thus causing the tillage tools 23 and 24 to be raised above the soil. At the same time, the torque tube 72 causes the first rocker arm 85 to pivot forward, thus pushing the linkage 91 to the front and causing the second rocker arm 92 to also pivot forward. This action causes the gauge wheel torque tube 94 to pivot clockwise, as illustrated, thus causing the lift arm 101 to pivot downward, leveling the front end of the wing portion 32 with the rear end thereof as the tillage tools 23 and 24 leave the soil.

The wing hydraulic cylinders 70 can be operated with the same control (not shown) that controls the center hydraulic cylinders 65 and 66, thus providing convenient simultaneous operation of the elevating systems and the lifting and self-leveling systems of all three frame sections 31, 32 and 33.

It is to be understood that while certain forms of the present invention have been illustrated and described herein, it is not to be limited to the specific forms or arrangement of parts described and shown.

What is claimed and desired to be secured by Letters Patent is as follows:

1. A lifting and self-leveling mechanism for an agricultural implement comprising:

(a) an implement frame portion supported by at least one rear ground engaging wheel connected to a first end of a rear pivot arm and a front ground engaging gauge wheel connected to a first end of a front pivot arm;

(b) means for pivotally connecting a second end of each of said rear and front pivot arms to said frame portion, said means for pivotally connecting including a front and a rear torque tube, each of which is pivotally connected to said frame and each of which is rigidly connected to said second end of the respective front or rear pivot arm;

(c) means for selectively pivoting said rear pivot arm relative to said frame portion to thereby raise and lower said frame portion relative to the ground; wherein said means for selectively pivoting comprises a rear lift arm rigidly attached at a first end to said rear torque tube; and (d) linkage means connected between said rear pivot arm and the front pivot arm, said linkage means adapted to pivot said front pivot arm in tandem with said rear pivot arm to thereby level said frame portion from front to back as it is raised or lowered, said linkage means comprising:

(i) a first rocker arm rigidly attached at a first end to said rear torque tube;

(ii) a linkage pivotably attached at a first end to a second end of said first rocker arm; and (iii) a second rocker arm pivotably attached at a first end to a second end of said linkage, and rigidly attached at a second end to said front torque tube; whereby (e) when said rear torque tube is pivoted relative to said frame, said first and second rocker arms are pivoted as well, with said second rocker arm causing said front torque tube to pivot in the same direction as said rear torque tube.

2. A mechanism as in claim 1, wherein said means for selectively pivoting comprises:

(a) hydraulic cylinder means connected to said frame and including a double acting piston pivotally connected to a second end of said lift arm.

3. A mechanism as in claim 1, and wherein said linkage means further comprises:

(a) adjustment means in said linkage for adjusting the pitch angle of said implement from front to back.

4. A mechanism as in claim 1, wherein:

(a) said frame portion is a hinged wing portion connected to a center frame portion of said implement.

5. A mechanism as in claim 4, wherein:

(a) said center frame portion includes a separate lifting and self-leveling means.

6. A lifting and self-leveling mechanism for an agricultural implement, said implement comprising a center frame portion and at least one hinged wing frame portion attached thereto, said mechanism comprising:

(a) a center lifting and self-leveling means connected to an implement hitch, to said center frame portion and to at least one center ground engaging support wheel, said lifting and self-leveling means being adapted to selectively lift and level said center portion from front to back;

(b) a separate wing lifting and self-leveling means connected to said wing frame portion and to at least one wing ground engaging support wheel of said at least one wing portion, said wing lifting and self-leveling means being adapted to selectively lift and level said wing portion from front to back, said wing lifting and self-leveling means comprising:
- (i) a rear pivot arm connected at one end to said wing ground engaging support wheel and a front ground engaging gauge wheel connected to a first end of a front pivot arm;
- (ii) means for pivotally connecting a second end of each of said rear and front pivot arms to said wing frame portion including a front and a rear torque tube, each of which is pivotally connected to said frame and each of which is rigidly connected to said second end of the respective front or rear pivot arm;
- (iii) means for selectively pivoting said rear pivot arm relative to said frame portion to thereby raise and lower said wing frame portion relative to the ground; and
- (iv) linkage means connected between said rear pivot arm and said front Divot arm, said linkage means pivoting said front pivot arm in tandem with said rear pivot arm to thereby level said implement from front to back as it is raised or lowered.

7. A mechanism as in claim 6, wherein:
- (a) there are two of said hinged wing frame portions, one of which is connected to each side of said center portion; and
- (b) each of said wing portions includes a separate wing lifting and self-leveling means.

8. A mechanism as in claim 6, wherein said means for selectively pivoting comprises:
- (a) a lift arm rigidly attached at a first end to said rear torque tube; and
- (b) hydraulic cylinder means connected to said frame and including a double acting piston pivotally connected to a second end of said lift arm.

9. A mechanism as in claim 6, wherein said linkage means comprises:
- (a) a first rocker arm rigidly attached at a first end to said rear torque tube;
- (b) a linkage pivotably attached at a first end to a second end of said first rocker arm; and
- (c) a second rocker arm pivotably attached at a first end to a second end of said linkage, and rigidly attached at a second end to said front torque tube; whereby
- (d) when said rear torque tube is pivoted relative to said frame, said first and second rocker arms are pivoted as well, with said second rocker arm causing said front torque tube to pivot in the same direction as said rear torque tube.

10. A mechanism as in claim 9, and wherein said linkage means further comprises:
- (a) adjustment means in said linkage for adjusting the pitch angle of said implement from front to back.

11. A lifting and self-leveling mechanism for an agricultural implement comprising:
- (a) an implement frame portion supported by at least one rear ground engaging wheel connected to a first end of a rear pivot arm and a front ground engaging gauge wheel connected to a first end of a front pivot arm, said rear and front ground engaging wheels supporting a single common side of said implement frame;
- (b) means for pivotally connecting each of said rear and front pivot arms to said frame, said means for pivoting comprising a front and a rear torque tube, each of which is pivotally connected to said frame portion and each of which is rigidly connected to a second end of the respective front or rear pivot arm;
- (c) means for selectively pivoting said rear pivot arm relative to said frame to thereby raise and lower said frame relative to the ground, said means for selectively pivoting comprising a lift arm rigidly attached at a first end to said rear torque tube; and hydraulic cylinder means connected to said frame and including a double acting piston pivotally connected to a second end of said lift arm; and
- (d) linkage means connected between said rear pivot arm and the front pivot arm, said linkage means pivoting said front pivot arm in tandem with said rear pivot arm to thereby level said implement from front to back as it is raised or lowered.

12. A mechanism as in claim 11, wherein said linkage means comprises:
- (a) a first rocker arm rigidly attached at a first end to said rear torque tube;
- (b) a linkage pivotably attached at a first end to a second end of said first rocker arm; and
- (c) a second rocker arm pivotably attached at a first end to a second end of said linkage, and rigidly attached at a second end to said front torque tube; whereby
- (d) when said rear torque tube is pivoted relative to said frame, said first and second rocker arms are pivoted as well, with said second rocker arm causing said front torque tube to pivot in the same direction as said rear torque tube.

13. A lifting and self-leveling mechanism for an agricultural implement comprising:
- (a) an implement frame portion supported by at least one rear ground engaging wheel connected to a first end of a rear pivot arm and a front ground engaging gauge wheel connected to a first end of a front pivot arm;
- (b) means for pivotally connecting each of said rear and front pivot arms to said frame, said means for pivotally connecting comprising a front and a rear torque tube, each of which is pivotally connected to said frame portion and each of which is rigidly connected to a second end of the respective front or rear pivot arm;
- (c) means for selectively pivoting said rear pivot arm relative to said frame to thereby raise and lower said frame relative to the ground, said means for selectively pivoting comprising a lift arm rigidly attached at a first end to said rear torque tube; and hydraulic cylinder means connected to said frame and including a double acting piston pivotally connected to a second end of said lift arm; and
- (d) linkage means connected between said rear pivot arm and the front pivot arm, said linkage means adapted to pivot said front pivot arm in tandem with said rear pivot arm to thereby level said implement from front to back as it is raised or lowered, said linkage means comprising:
  - (i) a first rocker arm rigidly attached at a first end to said rear torque tube;
  - (ii) a linkage pivotably attached at a first end to a second end of said first rocker arm; and
  - (iii) a second rocker arm pivotably attached at a first end to a second end of said linkage, and rigidly attached at a second end to said front torque tube; whereby (iv) when said rear torque tube is pivoted relative to said frame, said first and second rocker arms are pivoted as well, with said second rocker arm causing said front torque tube to pivot in the same direction as said rear torque tube.

14. A mechanism as in claim 13, and wherein said linkage means further comprises:
(a) adjustment means in said linkage for adjusting the pitch angle of said implement from front to back.

* * * * *